(12) United States Patent
Andrade-Cetto

(10) Patent No.: US 7,904,410 B1
(45) Date of Patent: Mar. 8, 2011

(54) CONSTRAINED DYNAMIC TIME WARPING

(75) Inventor: Lucio Andrade-Cetto, Natick, MA (US)

(73) Assignee: The Mathworks, Inc., Natick, MA (US)

( * ) Notice: Subject to any disclaimer, the term of this patent is extended or adjusted under 35 U.S.C. 154(b) by 966 days.

(21) Appl. No.: 11/798,581

(22) Filed: May 15, 2007

Related U.S. Application Data

(60) Provisional application No. 60/912,579, filed on Apr. 18, 2007.

(51) Int. Cl.
*G06F 17/00* (2006.01)
*G06N 5/02* (2006.01)

(52) U.S. Cl. .............................. 706/48; 704/255; 707/736
(58) Field of Classification Search .................... 706/48; 704/255
See application file for complete search history.

(56) References Cited

U.S. PATENT DOCUMENTS
6,671,669 B1 * 12/2003 Garudadri et al. ............ 704/255

OTHER PUBLICATIONS
"Chromatographic Alignment of ESI-LC-MS Proteomics Data Sets by Ordered Bijective Interpolated Warping", John T. Prince et al., Analytical Chemistry, vol. 78, No. 17, Sep. 1, 2006, pp. 6140-6152.

* cited by examiner

*Primary Examiner* — Donald Sparks
*Assistant Examiner* — Kalpana Bharadwaj
(74) *Attorney, Agent, or Firm* — Harrity & Harrity, LLP

(57) ABSTRACT

A method for processing data in two data sets may include executing a constrained time domain warping (CDTW) algorithm to compare the data in the two data sets. The CDTW algorithm may use a band constraint that defines a function used to identify potential matches between observations in the two data sets. The CDTW algorithm may also use a width constraint that defines a number of matched observations that are to be scored.

41 Claims, 14 Drawing Sheets
(5 of 14 Drawing Sheet(s) Filed in Color)

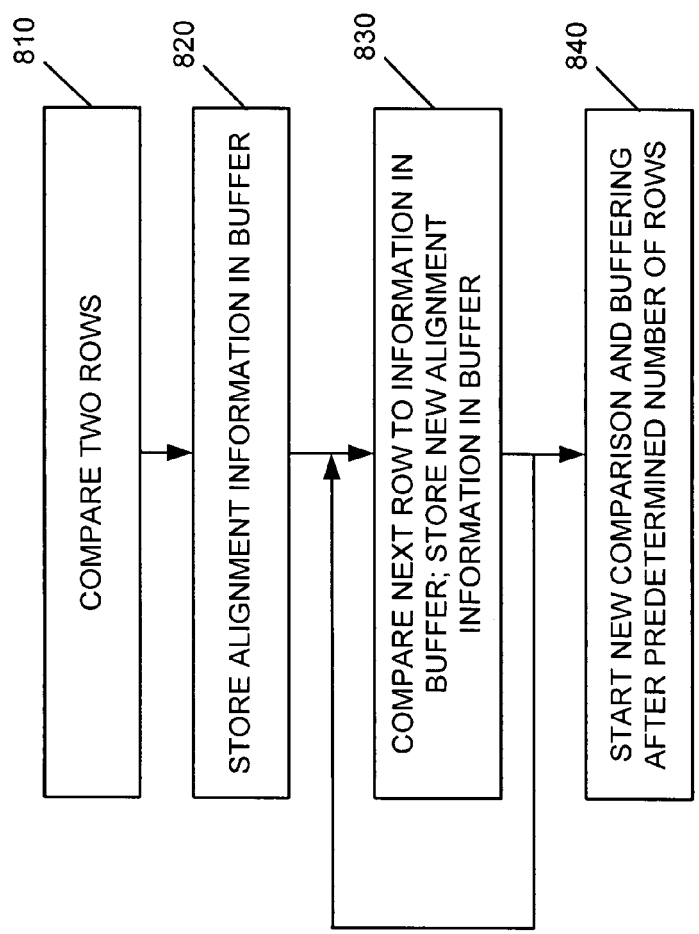

CONSTRAINED DYNAMIC TIME WARPING

RELATED APPLICATION

This application claims priority under 35 U.S.C. §119 based on U.S. Provisional Application No. 60/912,579, filed Apr. 18, 2007, the disclosure of which is hereby incorporated herein by reference.

BACKGROUND INFORMATION

Comparing data in a number of different data sets is often performed to gain information of interest. For example, different biological samples are often compared to identify similarities and/or differences in the samples. As another example, communication signals may be compared to identify a particular signal in a group of signals. In each case, it may be difficult to compare the data sets or signals due to modifications that may have occurred during processing of the data by one or more devices, systems, networks, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate one or more embodiments and, together with the description, explain these embodiments. In the drawings.

FIG. 8 is a flow chart of exemplary processing associated with buffering data and using the buffered data;

DETAILED DESCRIPTION

The following detailed description of exemplary embodiments refers to the accompanying drawings. The same reference numbers in different drawings may identify the same or similar elements. Also, the following detailed description does not limit the invention.

Overview

Figure 1:
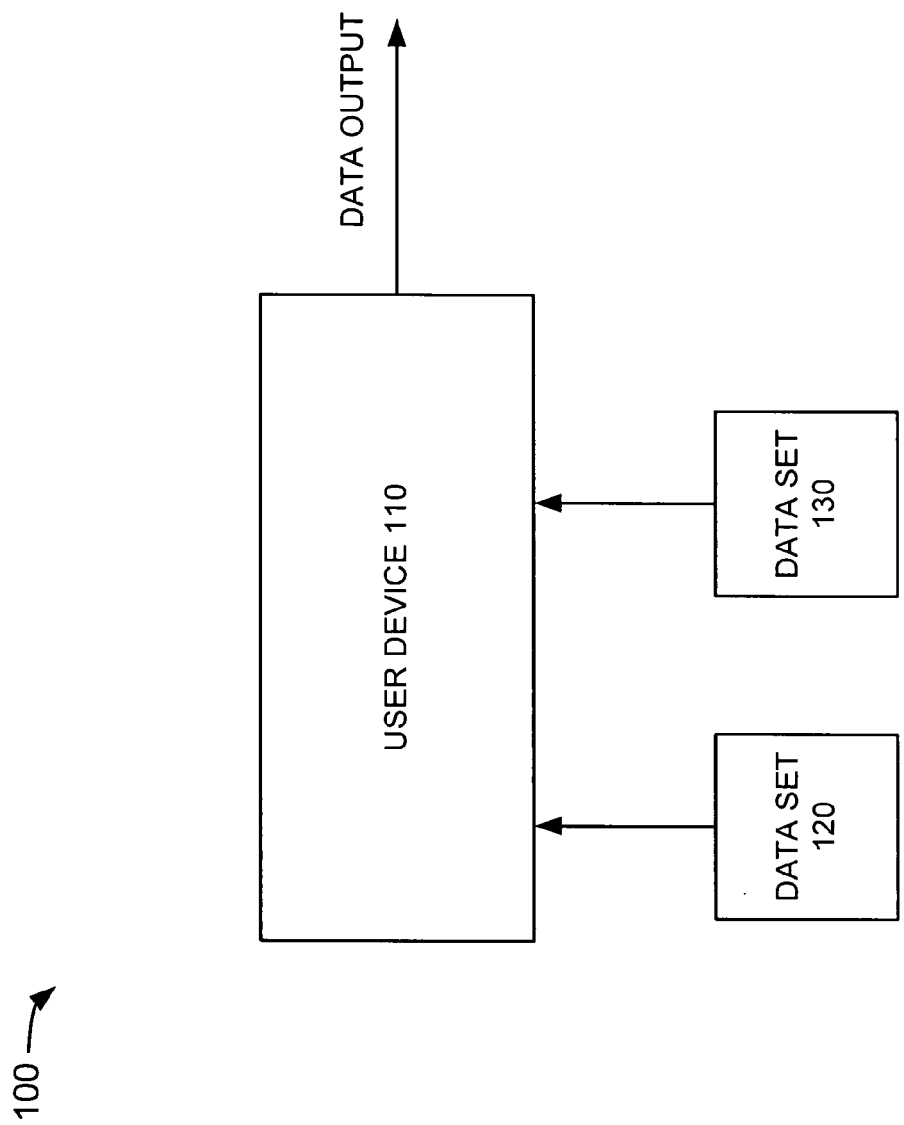
FIG. 1 is a diagram illustrating an exemplary system in which methods and systems described herein may be implemented.

Systems and methods described herein may process and compare input data sets and output information of interest to a user. FIG. 1 is an exemplary diagram illustrating a system 100 in which methods and systems described herein may be implemented. Referring to FIG. 1, system 100 may include user device 110 and data sets 120 and 130. User device 110, as described in detail below, may represent one or more computer devices that receive data sets 120 and 130 and process the data sets to obtain information of interest. For example, user device 110 may be a computer device, such as a desktop computer, a personal computer, a laptop computer, a client, a server, a mainframe, a personal digital assistant (PDA), a web-enabled cellular telephone, a smart phone, a smart sensor/actuator, or another computation or communication device that executes instructions to perform one or more activities and/or generator one or more results. Embodiments of user device 110 may employ electronic architectures, optical architectures, quantum architectures, biological computing architectures, wetware architectures, etc.

Data sets 120 and 130 may represent any type of input data that a user may wish to compare. A "data set" as the term is used herein, is to be broadly interpreted to include any input data that may be provided in a computer or machine-readable format. For example, a data set may include data associated with biological samples, such as data output from a mass spectrometer or liquid chromatography separation device, data associated with voice or other communication signals, or any other type of data.

In one embodiment, user device 110 may align or compare observations or signals in data sets 120 and 130 and output data based on the comparison. For example, in an exemplary embodiment, user device 110 may execute one or more algorithms that compare complex input data sets that may be warped or modified over time with respect to one another. In addition, in some implementations, user device 110 may provide graphical output associated with the comparison to allow a user to fine tune or modify the alignment or comparison.

Although FIG. 1 shows exemplary components of system 100, in other implementations, system 100 may contain fewer, different, or additional components than depicted in FIG. 1.

Exemplary User Device Architecture

Figure 2:
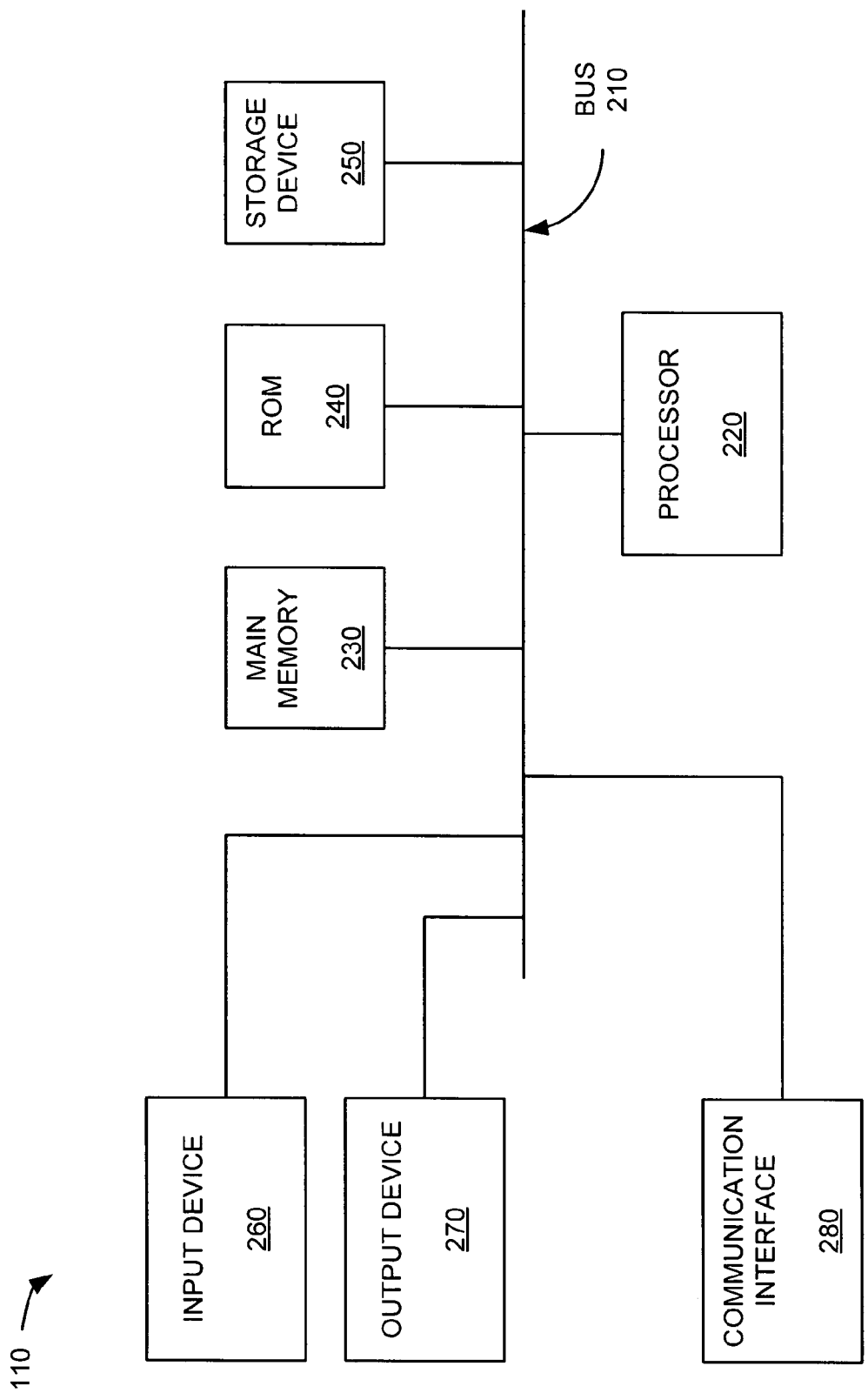
FIG. 2 is an exemplary diagram of the user device of FIG. 1.

FIG. 2 is an exemplary diagram of user device 110. As illustrated, user device 110 may include bus 210, processor 220, main memory 230, read only memory (ROM) 240, storage device 250, input device 260, output device 270, and communication interface 280. Bus 210 may include a path that permits communication among the elements of user device 110.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to user device 110, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables user device 110 to communicate with other devices and/or systems. For example, communication interface 280 may include mechanisms for communicating with other devices, such as other user devices via a network.

As will be described in detail below, user device 110, consistent with exemplary embodiments, may perform certain processing-related operations. User device 110 may perform these operations in response to processor 220 executing software instructions contained in a computer-readable medium, such as memory 230. A computer-readable medium may be defined as a physical or logical memory device and/or carrier wave. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, embodiments described herein are not limited to any specific combination of hardware circuitry and software.

Although FIG. 2 shows exemplary components of the user device 110, in other implementations, user device 110 may contain fewer, different, or additional components than depicted in FIG. 2. In still other implementations, one or more components of user device 110 may perform the tasks performed by one or more other components of user device 110.

Exemplary Functional Operation of User Device

Figure 3:
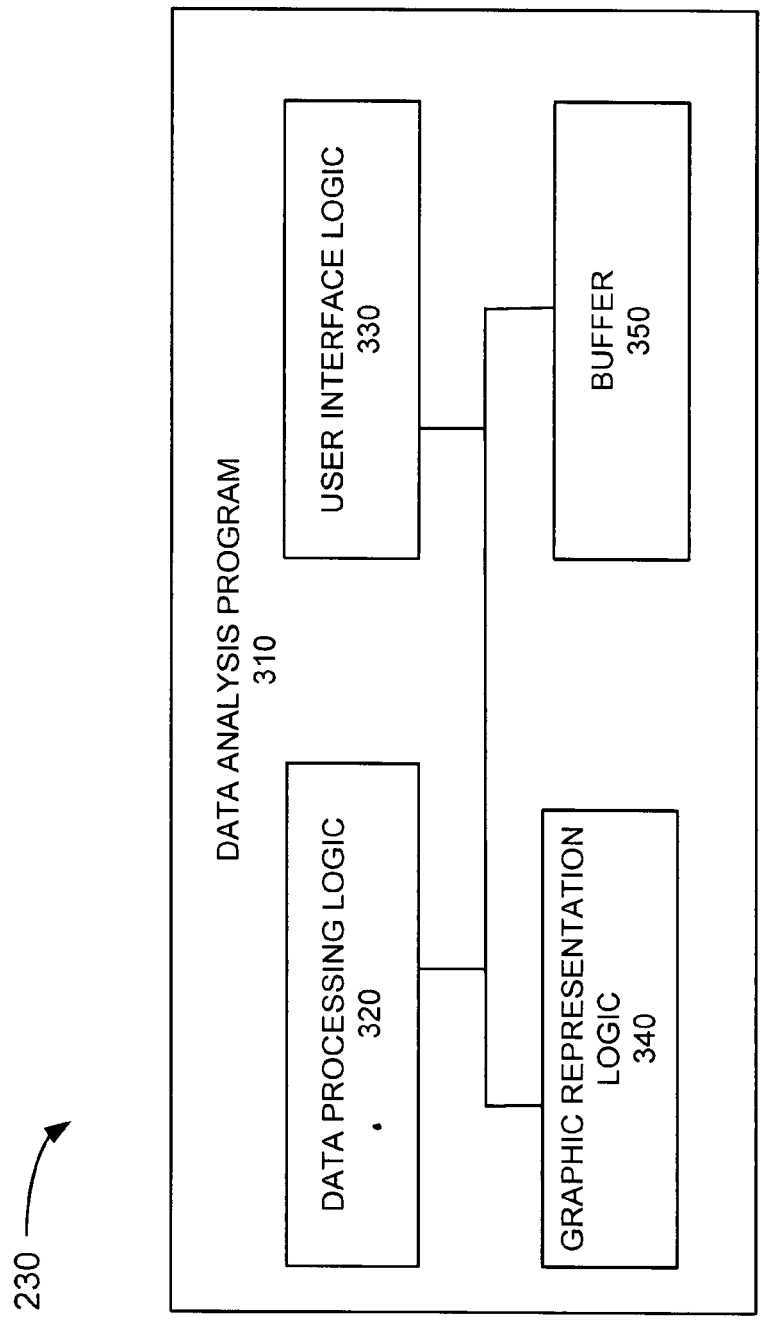
FIG. 3 is a functional block diagram of exemplary components implemented in the user device of FIG. 2.

FIG. 3 is a functional block diagram of exemplary components implemented in user device 110 of FIG. 2, such as in memory 230. Referring to FIG. 3, memory 230 may store a data analysis program 310 that is used to process input data sets. In an exemplary implementation, data analysis program 310 may be used to compare data sets associated with biological compounds processed using mass spectrometry (MS) equipment and/or chromatography equipment.

In general, a mass spectrometer is a device used to measure the mass-to-charge ratio of ions. The mass spectrometer identifies the composition of a physical sample by generating a mass spectrum representing the masses of the sample components. Aspects described herein may be used in used in connection with comparing data sets output by a number of different MS devices, such as a matrix-assisted laser desorption/ionization (MALDI) MS device, a surface-enhanced laser desporption/ionization (SELDI) MS device, an electrospray ionization (ESI) MS device, a time of flight (TOF) MS device, etc.

In general, chromatography is the collective term for a family of laboratory techniques for the separation of mixtures of chemical compounds. Chromatography involves passing a mixture dissolved in a mobile phase through a stationary phase, which separates the analyte to be measured from other molecules in the mixture and allows the analyte to be isolated. Aspects described herein may be used in connection with comparing data sets output by a number of different chromatography devices, such as a high performance liquid chromatography (HPLC) device, a liquid chromatography (LC) device, a capillary electrophoresis (CE) device, a gas electrophoresis (GE) device, a gas chromatography (GC) device, etc.

Data analysis program 310 may compare the information output by the MS equipment and/or chromatography equipment. In other implementations, data analysis program 310 may be used to compare data sets associated with voice signals, data sets associated with speech or voice signaling, data sets associated with medical imaging, or data sets associated with other types of information, as described in more detail below.

Data analysis program 310 may include data processing logic 320, user interface logic 330, graphic representation logic 340 and buffer 350. Data processing logic 320, user interface logic 330, graphic representation logic 340 and buffer 350 are shown in FIG. 3 as being included in data analysis program 310. In alternative implementations, these components or a portion of these components may be included in different programs executed by user device 110 and/or one or more of these components may be located externally with respect to data analysis program 310.

Data processing logic 320 may process observations in two or more sequences of data and attempt to match the observations for comparison purposes. In an exemplary implementation, data processing logic 320 may execute a constrained dynamic time warping (CDTW) algorithm that scores potential matches between the observations. The CDTW algorithm may also provide penalties or larger scores for observations in which no match is identified. These non-matching observations are referred to herein as gaps. Data processing logic 320 may minimize the sum of positive scores resulting from matched observations and penalties resulting from gaps.

For example, in one implementation, data processing logic 320 may execute a shortest-path graph-theory based algorithm to align or match the observations in the data sets. The observations may have any number of dimensions. In other words, an observation may represent the outcome of an experiment and may be represented by a multi-dimensional random variable. In addition, the observations in each sequence may be ordered. The ordering index, or any physically measurable value, may also be part of the observation vector. By allowing multi-dimensional observations, data processing logic 320 may be able to process data much more efficiently than conventional CDTW algorithms in which the observations are represented by a one-dimensional variable that is ordered by a time vector.

Data processing logic 320 may also allow the user to input various constraints associated with comparing the data sets. These constraints may allow data processing logic 320 to perform the processing in a computationally efficient manner that requires less processing resources and/or memory resources than conventional CDTW algorithms, as described in detail below.

User interface logic 330 includes logic that allows the user to input various constraints associated with performing the CDTW algorithm executed by data processing logic 320. User interface logic 330 may also allow the user to modify various parameters associated with performing the CDTW algorithm to allow the use to fine tune or modify the processing, as described in detail below.

Graphic representation logic 340 may include logic that provides an interactive approach to computing and displaying a search space associated with the input data sets processed by data processing logic 320. In an exemplary implementation, graphic representation logic 340 may generate and output a graphical representation of the search space. This graphical view of the search space may allow the user to quickly determine if constraints associated with the search space need to be modified to, for example, reduce the size of the search space. Graphic representation logic 340 may also generate and output a graph illustrating the shortest path alignment for two input data sets. This graphical view of the shortest path alignment may allow the user to determine if scoring associated with the matched observations and gaps may need to be modified, without having data processing logic 320 allocate memory and other resources needed to run the full CDTW algorithm.

Buffer 350 may include information associated with previous alignments of data in data sets. The previous alignment data may be generated and stored prior to running the CDTW algorithm by data processing logic 320. That is, information in buffer 350 may be stored off-line prior to running the CDTW algorithm. Alternatively, the information stored in buffer 350 may be stored dynamically while data processing logic 320 is executing the CDTW algorithm. For example, data processing logic 320 may store comparison data associated with, for example, spectra in the data sets, and modify the data in buffer 350 as additional comparisons are performed, as described in detail below.

Although FIG. 3 shows exemplary components of user device 110, in other implementations, user device 110 may contain fewer, different, or additional components than depicted in FIG. 3. In still other implementations, one or more components of user device 110 may perform the tasks performed by one or more other components of user device 110.

Exemplary Processing

Figure 4A:
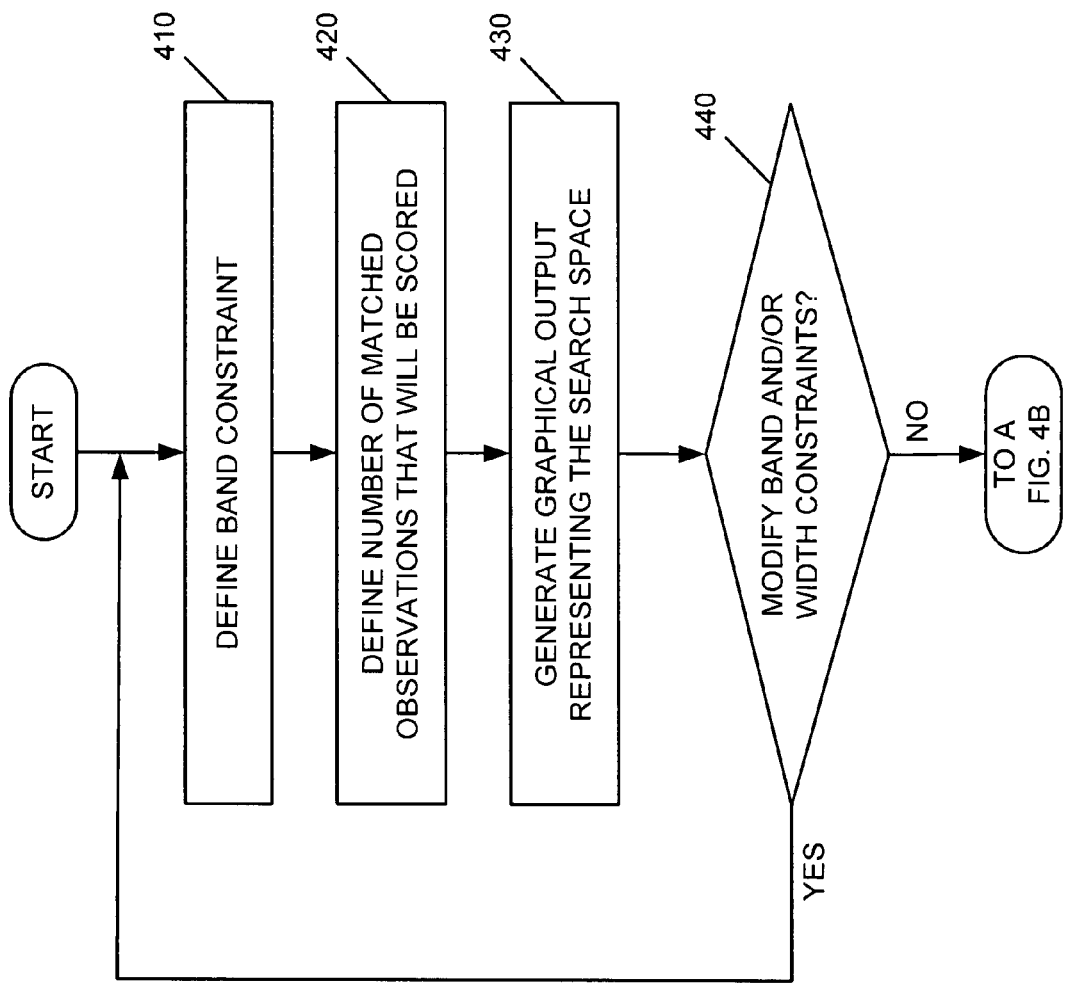
FIGS. 4A and 4B are flowcharts of exemplary processing associated with the data analysis program of FIG. 3.
Figure 4B:
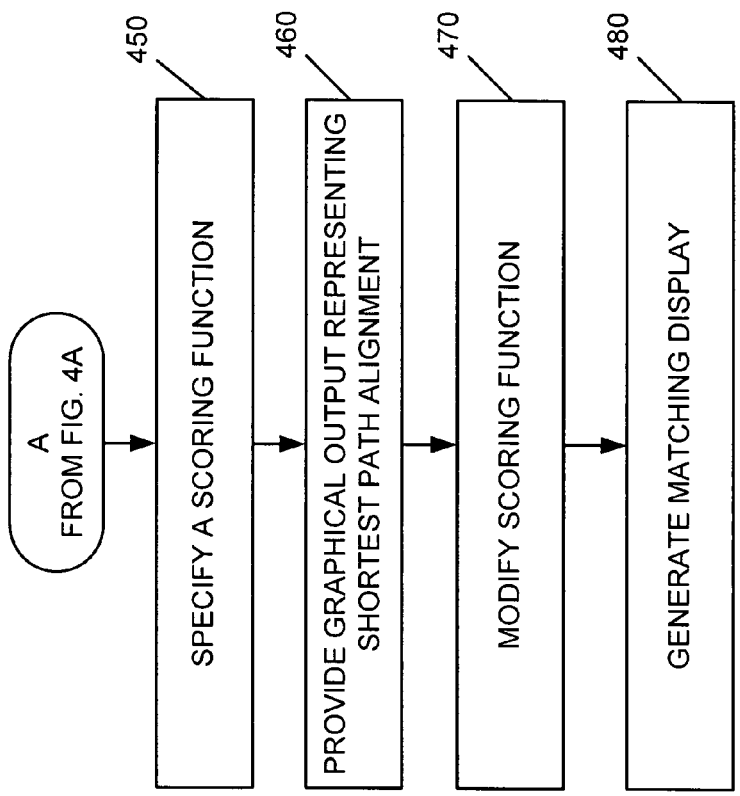

FIGS. 4A and 4B are flowcharts of exemplary processing associated with data analysis program 310, consistent with an exemplary embodiment. The processing described below is directed to analyzing components (e.g., compounds) in a hyphenated mass spectrometry data set and comparing components in different biological samples. For example, assume that a user wishes to compare two data sets that represent hyphenated mass spectrometry biological samples. The two data sets may come from, for example, 1) the same specimen, but may be in different biological states of a disease or normal development, 2) the same specimen, but have been treated with different drugs and/or different injection volumes, 3) the same or similar species, but with/without a particular biological state (e.g., disease vs. control). It should be understood, however, that the processing described herein may be used to compare other types of data sets including data sets that are not associated with biological samples (e.g., voice signals, image data, etc.).

Processing may begin with a user defining a band constraint associated with comparing or aligning the two data sets (act 410). A band constraint may define the maximum allowable distance used to match observations in the two data sets. For example, a given observation S in one data set may be matched with observations in a second data set whose values fall within S±BAND constraint. Using the band constraint in this manner may reduce the time and memory complexity of the CDTW algorithm performed by data processing logic 320. For example, the complexity may be reduced from $O(MN)$ to $O(sqrt(MN)*K)$, where M and N are the number of observations in the input sequences, and K is a small constant such that $K<<M$ and $K<<N$ (i.e., K is much smaller than M and N). The shift or misalignment may be measured in terms of the dimension that is used as the ordered reference of the input sequences.

In an exemplary implementation, the user may define the band constraint as a function of the reference dimension, as opposed to being a constant value. The particular function may be based on the user's experience and knowledge with the particular types of data in the data sets.

For example, assume that the reference dimension is time. The user may know that the distances (e.g., time) between samples in the data sets change over time and are not evenly spaced. As an example, assume that observations in a first part of the data sets are spaced closely together while observations in the second part of the data sets are spaced further apart. In this case, the user may determine that misalignment between observations in the first part of the data set is relatively small, such as 10 milliseconds (ms). However, during the second portion of the data set, the user may determine that the misalignment between observations in the second part of the data sets is much larger, such as more than 30 ms. In this case, the user may provide a function of the reference dimension (e.g., time in this example) that represents changes associated with misalignment of observations in the data sets. In this simple example, the function may indicate that the band constraint for observations corresponding to the first part of the data set (e.g., a portion of the data sets having a duration of X seconds) is 10 ms and that the band constraint for observations in the second part of the data set (from point X through the end of the data sets) is 30 ms. The user may provide this function to data analysis program 310 via user interface logic 330.

Specifying a function of the reference dimension as a constraint, as opposed to using a constant band constraint may allow for more efficient processing of sequences of observations or traces in which the sampling rate may follow a function of the reference dimension or may be variable. As one example, in chromatography experiments, the drift or misalignment may be dependent of the weight of the components in the sample. As another example, in time-of-flight (TOF) mass spectrometry, there may be a quadratic relationship between the sampling rate and the resolution of the peaks in the signal. Therefore, using a function to identify a matching constraint may allow for more accurate and efficient matching of observations in various data sets.

The user may further constrain the search space associated with the two data sets by defining a number of matched observations that will be scored for each observation (act 420). This constraint, referred to herein as the "width" constraint, may limit the processing burden on data processing logic 320 associated with scoring very large numbers of matched observations. That is, each observation in the first input data set may be scored to the closest U observations in the second input data set and each observation in the second input data set may be scored to the closest V observations in the first input data set. The user may provide the width constraint to data analysis program 310 via user interface logic 330.

Closeness between observations (i.e., the width constraint) may be measured using the reference dimension. In this manner, defining a width constraint may reduce the time and memory complexity of data processing logic 320 and/or graphic representation logic 340. For example, using the width constraint may reduce the complexity of the processing performed by data processing logic 320 from $O(MN)$ to $O(\text{square root }(MN)*\text{square root }(UV))$, where M and N are the number of observations in the first and second input data sets, respectively, and $U<<M$ and $V<<N$ (i.e., U and V are much smaller than M and N, respectively).

As described above, a band constraint may be a user definable function of the distance along the reference dimension between samples to be paired. Therefore, in some implementations, an a priori statistical characterization or modeling may be performed in which the observable distances in the reference dimension are treated as random variables. The user may estimate a statistical model and assign a threshold over the a posteriori probability to include/exclude samples within or outside the width constrained search space. For example, the Weibel distribution may be utilized to statistically characterize the expected distance between matching samples.

Data analysis program 310 may also provide an interactive approach to graphically computing and observing the search space associated with the band and width constraints provided by the user via user interface logic 330 without having to allocate memory and processing resources to run the CDTW algorithm executed by data processing logic 320.

For example, graphic representation logic 340 may use the band and width constraints provided by the user and generate a graphical output representing the search space (act 430). In an exemplary implementation, graphic representation logic 340 may output a graphical representation of the search space in the index domain and the reference dimension domain.

Figure 5A:
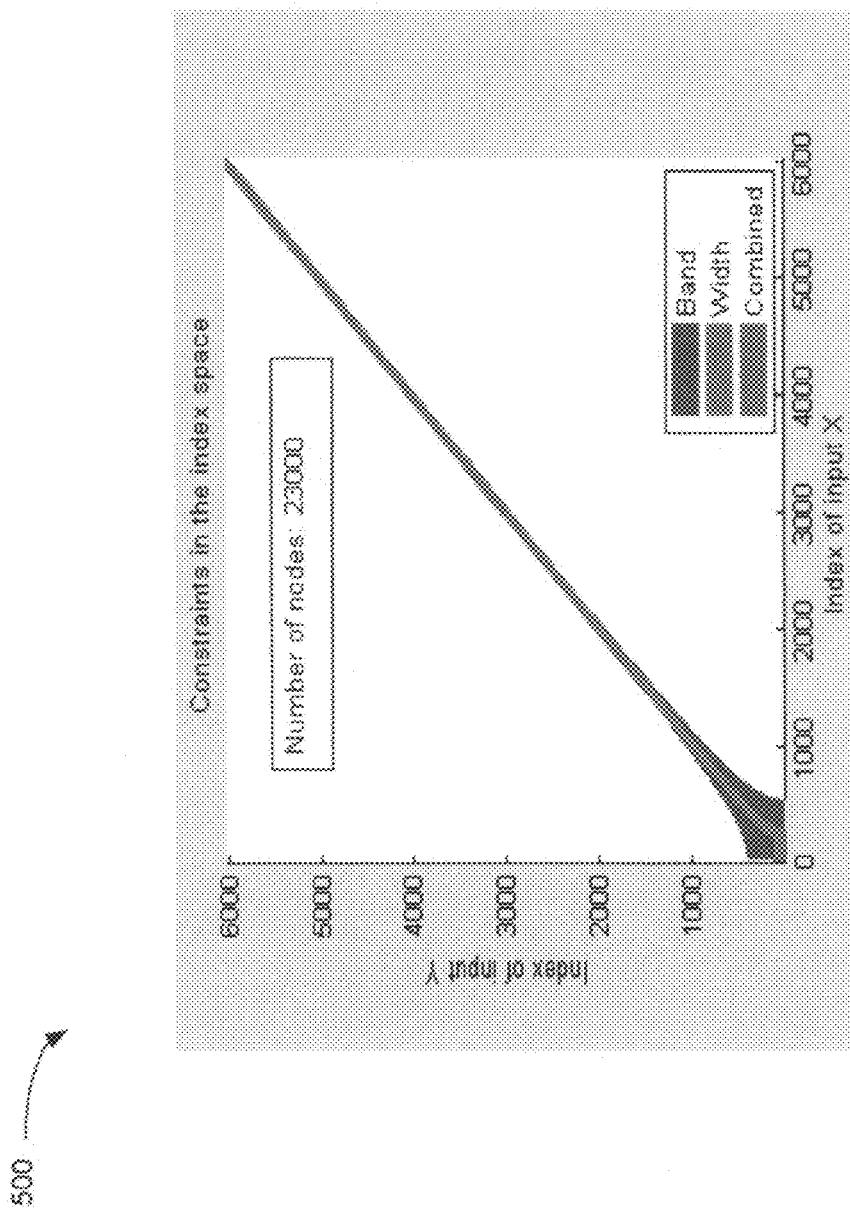
FIGS. 5A and 5B illustrate exemplary graphs associated with a constrained search space.

As one example, graphic representation logic 340 may generate graph 500 that represents the observations associated with the two input data sets, as illustrated in FIG. 5A Referring to graph 500, input X may represent the first data set that includes 6000 observations and input Y may represent the second data set having 6000 observations. Therefore, the search space in the index domain includes a grid of 6000× 6000 observations (also referred to herein as nodes) or 36 million potential nodes. Graphic representation logic 340 may represent the nodes defined by the band constraint in blue, represent the nodes defined by the width constraint in green and represent the nodes defined by the combined band and width constraints in red. As illustrated, the total number of nodes defined by the band constraint at the lower left portion of graph 500 is much greater than the nodes defined by the band constraint at other portions of graph 500. As also illustrated, the number of nodes defined by the combined band and width constraints in this example is 23,000. Therefore, graph 500 allows the user to observe that the search space has been reduced from 36 million potential nodes in the index space to 23,000 potential nodes.

Figure 5B:
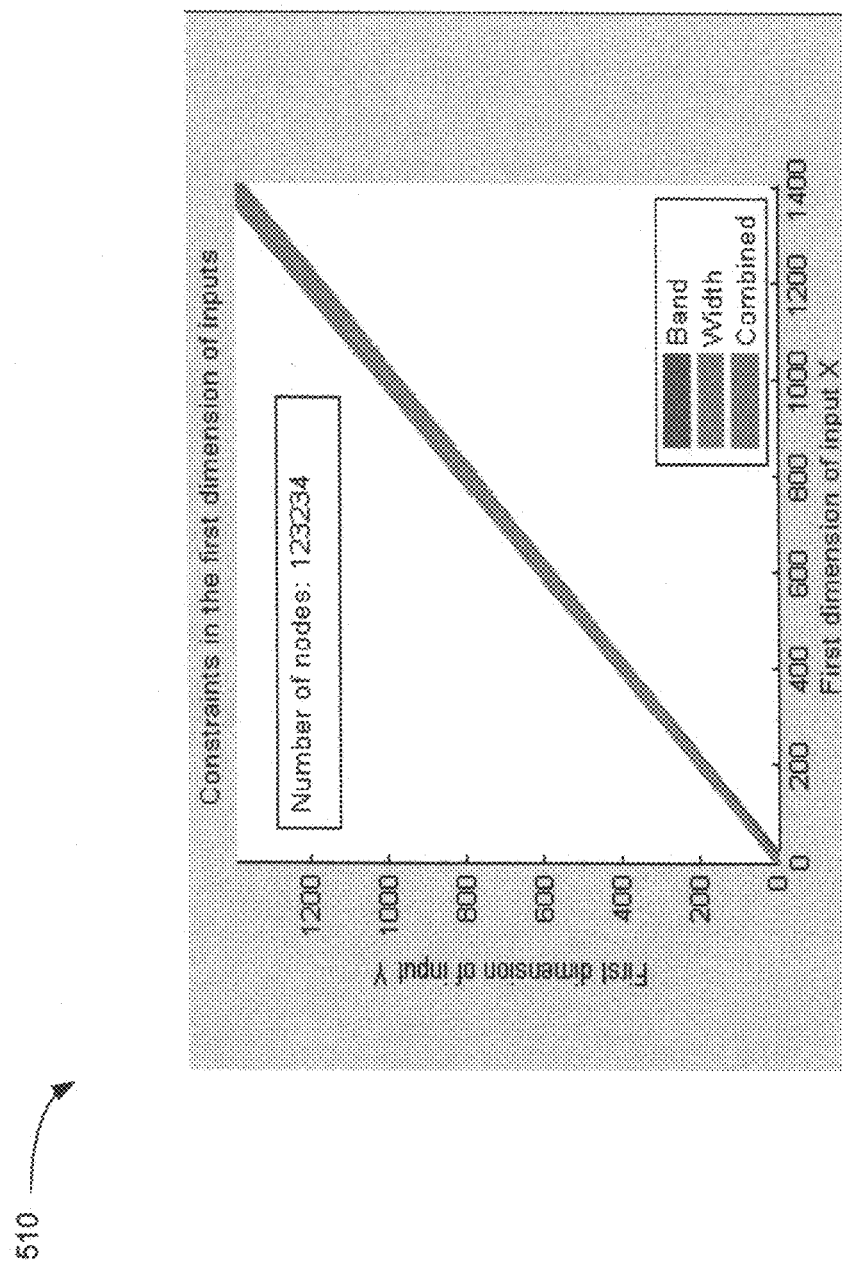

Graphic representation logic 340 may also generate and output a graphical representation of the search space in the reference dimension domain, as illustrated by graph 510 in FIG. 5B. Referring to FIG. 5B, in this example, input X represents the first data set that ranges from 0-1400 in the reference dimension (e.g., time in this example) and input Y represents the second data set that ranges from 0-1400 in the reference dimension. In the reference dimension, a number of samples or nodes, such as thousands of samples, may be arranged in the reference dimension in the range between 0 and 1400 and may be non-evenly spaced. Similar to graph 500, the nodes defined by the band constraint in graph 510 are illustrated in blue, the nodes defined by the width constraint are illustrated in green and the nodes defined by the combined band and width constraints are illustrated in red. As illustrated, the total number of nodes defined by the combined band and width constraints in this example is 123,234.

The user may view graphs 500 and 510 via, for example, a display (e.g., output device 270, FIG. 2). The user may also be able to visually observe the search space prior to data processing logic 320 running the CDTW algorithm to determine whether the search space has been sufficiently constrained. In other words, graphic representation logic 340 may provide graphs 500 and/or 510 to allow the user to assess the complexity associated with the data sets to be compared by the CDTW algorithm before running the CDTW algorithm. That is, the graphical representations in FIGS. 5A and 5B allow the user to visualize and better understand the dynamics associated with varying constraints in both the index space (FIG. 5A) and in the reference dimension space (FIG. 5B). This may be particularly useful in situations in which the sequences or samples in the data sets are not evenly sampled in an reference dimension space.

For example, the user may observe graphs 510 and 520 and determine whether to modify the band and/or width constraints (act 440). For example, if the number of nodes in the constrained search space is too high (e.g., over 1 million nodes), the user may determine that the band and/or width constraints need to be further modified to attempt to reduce the search space. In this case, processing may return to act 410 and the user may modify, for example, the function representing the band constraint to more narrowly define the band constraint. The user may also modify the width constraint to reduce the number of matched observations that are to be scored. Graphic representation logic 340 may generate new graphs corresponding to the modified band and/or width constraints. If the user is satisfied that the search space is sufficiently constrained, the user may provide no additional modifications to the band and width constraints and processing may continue.

As described above, data analysis program 310 may score observations and gaps to determine a shortest path alignment between data sets. In an exemplary implementation, the scores associated with matches and gaps may be application dependent and may be determined by the user based on the user's experience with the particular application. The scores may be provided by the user via user interface logic 330. In an exemplary implementation, the matches and gap scores (also referred to herein as gap penalties) may be based on a scale from, for example, 0 to 100. Matched observations may generally receive a very low score (e.g., zero) and gaps may receive higher scores. Gap scores may also be dependent on where in the data sets the gaps are located.

In general, if the gap penalties are large relative to the score of the matched observations, the CDTW algorithm executed by data processing logic 320 may return alignments with fewer gaps, but with more incorrectly aligned regions. If the gap penalties are smaller, the output alignment may contain longer regions with gaps and fewer matched observations.

Data analysis program 310 may also allow the user to specify a scoring function associated with scoring potential matches and gaps (act 450). For example, in one implementation, a user may provide a scoring function in which the scores range from 0 to 100. As discussed above, the matches typically have a score of zero and the gaps have higher scores and may depend on where the particular gaps in the alignment are located, as described in detail below. The user may enter the scoring information via user interface logic 330.

Figure 6:
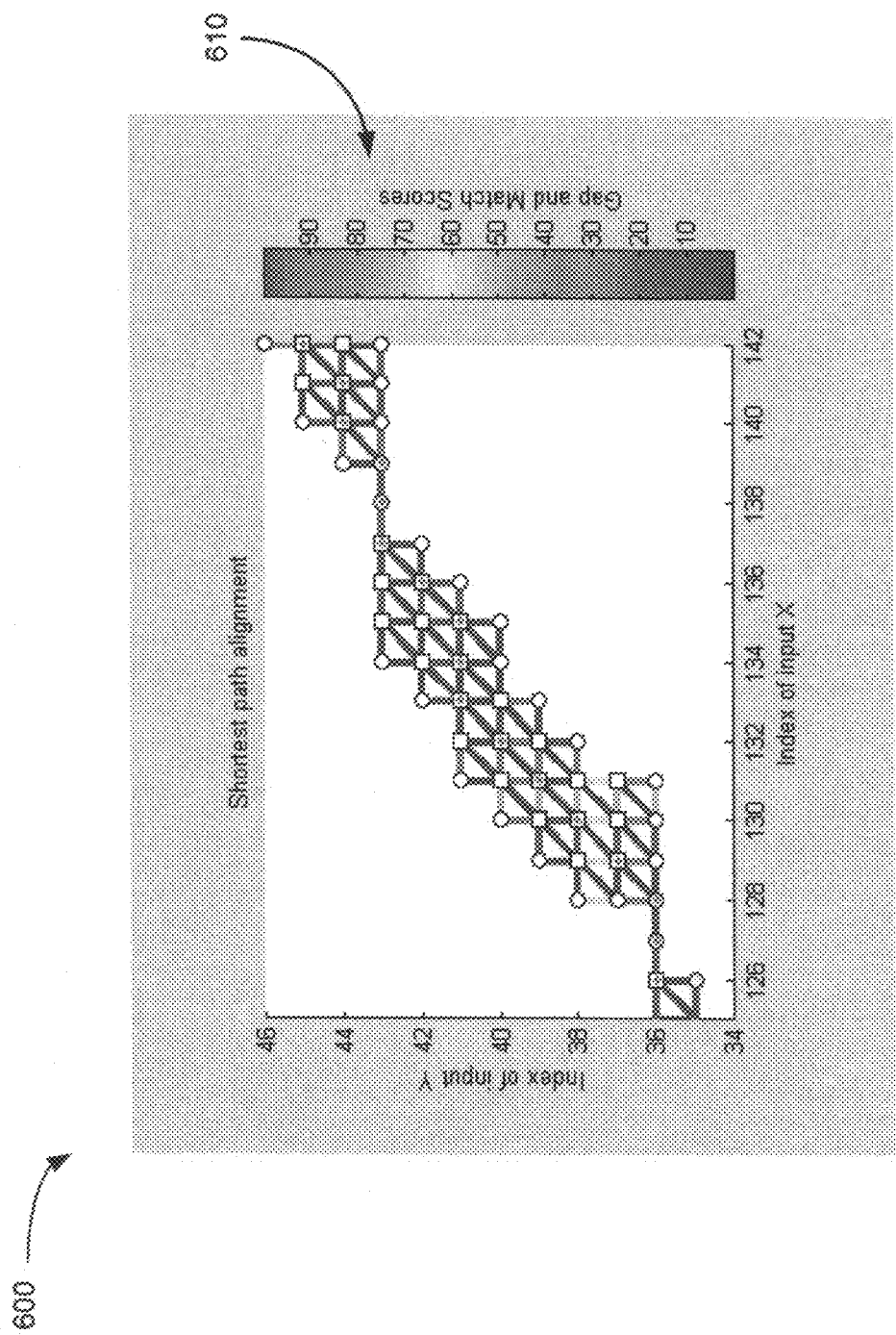
FIG. 6 is an exemplary graph illustrating a shortest path alignment.

Graphic representation logic 340 may generate and output a graphical representation of the shortest path alignment for the two data sets (act 460). For example, FIG. 6 illustrates an exemplary shortest path alignment graph 600 for two data sets (e.g., data sets X and Y) output by graphic representation logic 340. Referring to FIG. 6, graph 600 may represent possible paths through the constrained search space that the CDTW algorithm needs to evaluate before reaching a global optimal alignment. In this example, the squares represent decision points for computing the optimal alignment for two given samples in the sequences and the circles represent utility nodes that allow for the insertion of contiguous gaps in the same or in alternate sequences. The diagonal lines represent potential matches and horizontal and vertical lines represent gaps or non-matches.

Graph 600 may also provide color information corresponding to the gap scores and match scores using a unified scoring scale. For example, region 610 of graph 600 may include a bar graph of the gap and match scores and colors corresponding to these scores. The edges or lines shown in the various colors in graph 600 correspond to the gap and match scores provided at region 610. For example, in graph 600, an edge shown in red, such as any of the vertical edges shown at area 620 of graph 600, corresponds to a gap score that ranges from approximately 80 to 100. Using color in graph 600 may permit the user to visually assess alternative paths that could be followed and to easily evaluate the scores using the color information provided for the particular edges/lines in an alternative path.

Data processing logic 320 may identify the shortest path alignment between the input data sets based on the scores and gap penalties. That is, data processing logic 320 identifies the path with the lowest score from the first matched observation located in the lower left corner of graph 600 to the last matched observation located in the upper right corner of graph 600. Graphic representation logic 340 may represent the selected shortest path by the use of horizontal, vertical and/or diagonal edges with the selected nodes (i.e., both matched observations and gaps) being designated with a plus sign located within the particular node.

For example, as shown in FIG. 6, the input at point 126 on the X-axis is matched to the input at point 36 on the Y-axis, as indicated by the plus sign in the square at this point. The two horizontal lines or edges connecting the point at X,Y coordinate (126,36) to the point at coordinate (128,36) represent gaps in the alignment. The gap scores associated with these two gaps in the alignment are illustrated in blue, which correspond to a low gap penalty as indicated in the gap and match score graph illustrated at area 610 of graph 600. The diagonal line connecting the gap at coordinate (128,36) to the point at coordinate (129,37) represents a match between the observation at point 129 in the first data set to the observation at point 37 in the second data set. The remaining portion of the shortest path alignment in graph 600 may be connected in a similar manner. That is, various gaps and matches are connected, as denoted via the plus signs and the gap score penalties are denoted by the particular color of the lines connecting matches to gaps and gaps to gaps.

The user may view graph 600 and determine whether the shortest path is adequate and/or is correct for the user's data analysis purposes. For example, referring to FIG. 6, the user may identify alternative paths that could be identified. As an example, the user may determine that graph 600 could have been traversed by connecting two more horizontal gaps from the point at coordinate (128,36) to the point at coordinate (130,36) and then connecting point (130,36) to the point at (130,38) via two vertical edges or lines. The first vertical edge on this path, however, is illustrated in red, which corresponds to a high gap score. Therefore, the shortest path in graph 600 bypasses this path in favor of the illustrated path since the illustrated path represents the lowest score (i.e., the shortest path). The user based on his/her experience may determine that the path illustrated in graph 600 is not optimal.

As described above, the user may provide the gap scoring information based on the particular types of data and his/her experience with such data. In an exemplary implementation, data analysis program 310 may permit the user to better control the shortest path alignment by allowing the user to define his/her own metric to measure the distance between two potential matches, as opposed to using a scoring function based on the Euclidean distance between observations of potential matches.

For example, if data analysis program 310 is performing a CDTW algorithm to synchronize spectra in a hyphenated mass-spectrometry data set, the user may employ a particular correlation between spectra that emphasizes the regions of the signals that contain peaks and minimizes or ignores the regions that have intensities comparable to the baseline of the spectrum. In some instances, the lower intensity regions may correspond to noise that may not be of interest to the user. In addition, in some implementations, since the reference dimension may be considered to be part of the observation vector, the scoring function may be adaptable to different regions of the data, as described in more detail below.

For example, in some implementations, data analysis program 310 may provide a user with better control of the shortest path alignment by allowing the user to use a function that assigns gap penalties based on the reference dimension. In conventional implementations of CDTW, only constant gap penalties are used. In an exemplary implementation, the user may provide a function that can adapt to different regions of the sequences where one expects the likelihood of gaps to change. For example, if the likelihood of a gap is expected to change, the user may provide a function that addresses the expected gap in a particular region by, for example, reducing the gap penalty in this region. This may allow the user to further fine tune the gap scoring based on the user's experience with the particular types of data.

If the user does not wish to provide the gap scoring functions described above, data analysis program 310 may allow the user to set either one of match scores or gap penalties and data analysis program 310 will set the other score (e.g., match or gap score). For example, if the user wishes to concentrate only on scoring matches, data analysis program 310 may automatically calculate a relatively safe gap penalty, which has been shown to behave appropriately in most instances. For example, data analysis program 310 may use a default gap penalty of a Q quantile of the observed match scores constrained within the search space. As one example, a relatively safe value for Q may be 0.75.

In each case, the user may view graphical representation of the shortest path alignment, as illustrated by graph 600. The user may then be able to better understand and tune scores and penalties around problematic regions of the alignment. That is, the user may, if necessary, modify the function assigning gap scores and penalties (act 470). A new shortest path alignment may then be calculated and displayed to the user.

In this manner, a user may be provided a graphical representation of the shortest path alignment that allows the user to visualize the programming performed by the CDTW algorithm. This visualization may facilitate changes to a scoring function and/or provide the user a better understanding of the processing being performed by the CDTW algorithm executed by data processing logic 320.

Data analysis program 310 may also allow the user to graphically evaluate the alignment performed by the CDTW algorithm. For example, data processing logic 320 may execute the CDTW algorithm and output a graphical representation of the matches, as illustrated in FIG. 7A (act 480).

Figure 7A:
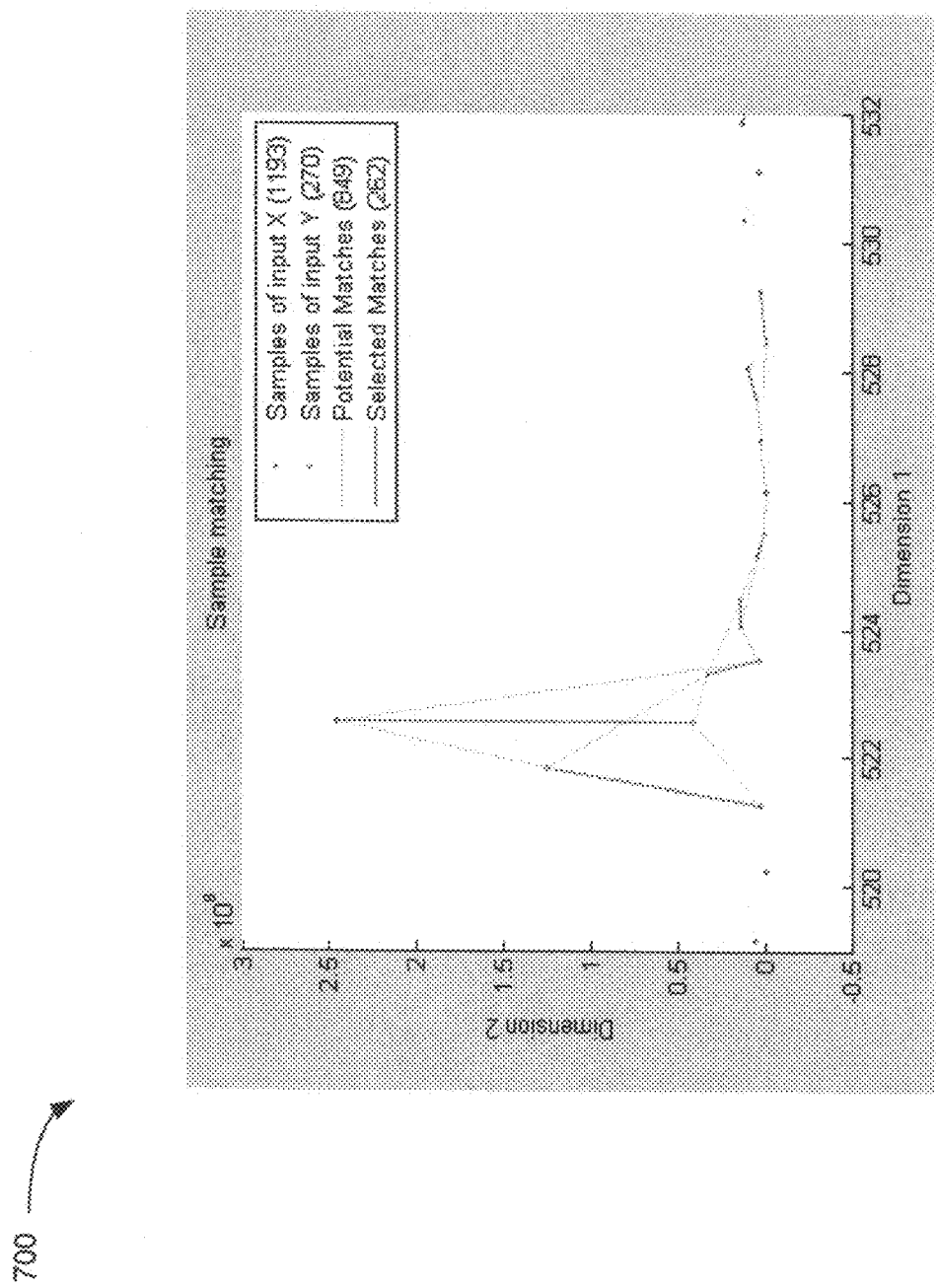
FIGS. 7A and 7B illustrate exemplary graphs of matches.

For example, referring to FIG. 7A, graph 700 may display the first and second columns of the input sequences in the abscissa and the ordinate, respectively, of a two dimensional plot. Links between the scored pairs that meet the band and width constraints are displayed and the matched observations belonging to the output alignment are highlighted. It should be noted that FIG. 7A represents a centroided input data set. A centroided data set may represent a data set in which peaks are identified and other points or nodes are ignored. Such centroided data sets may be used in a LC-MS sample.

Referring to FIG. 7A, peaks associated with samples of input X may be illustrated in blue and peaks associated with samples of input Y may be illustrated in green. Matches between the peaks may be illustrated in red as vertices or lines connecting the blue and green points. Potential matches between peaks may be illustrated in gray. A user may view the sample matching in FIG. 7A and determine that the scoring needs to be modified. For example, in FIG. 7A, many of the smaller peaks are matched at the right side of graph 700. These smaller peaks may correspond to noise and may be less important than the higher peaks illustrated near point 522 on the X-axis. For example, a user may want to see the sample of input Y just before point 522 on the X-axis matched to the highest peak of the sample of input X just after point 522 on the X-axis. This non-matching of these highest peaks in the sample sets X and Y may indicate that further fine tuning of the gap scoring may be needed.

Figure 7B:
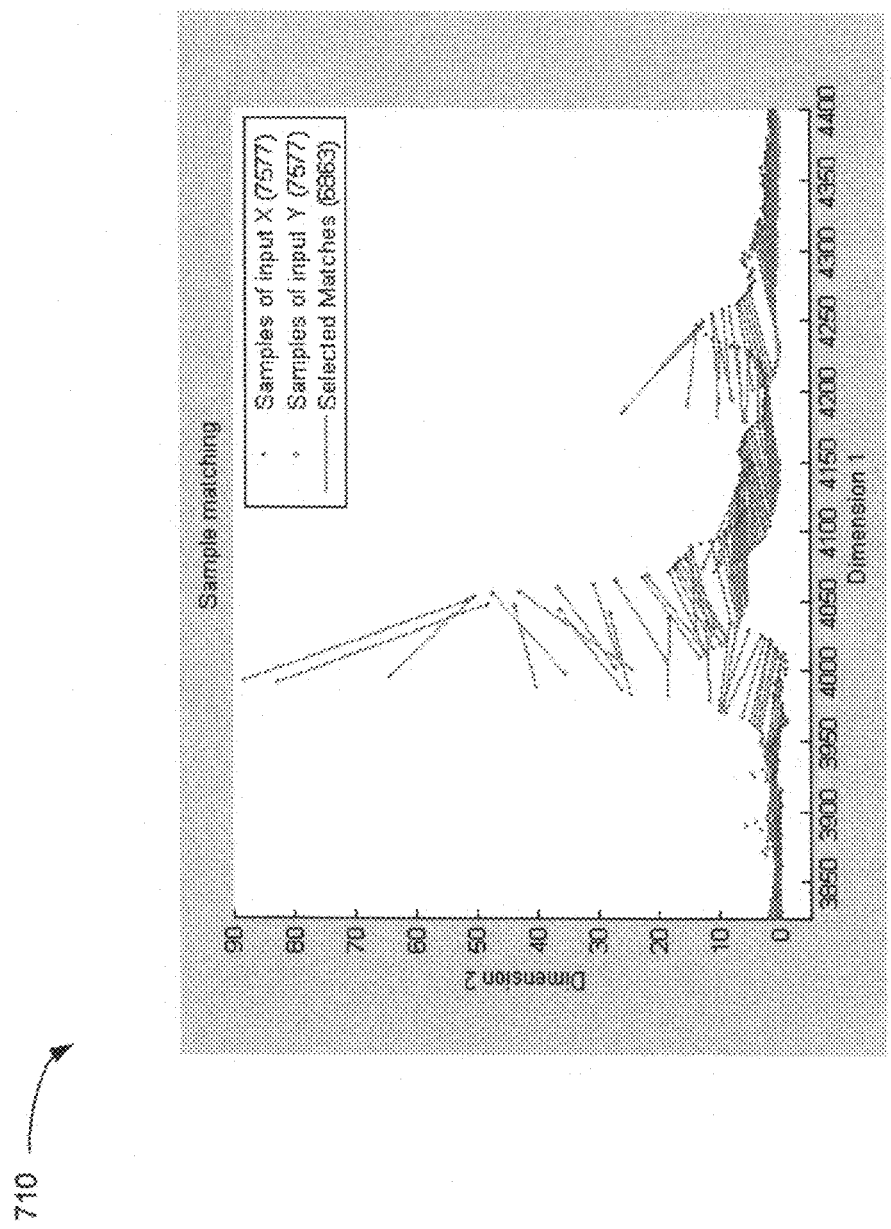

Data analysis program 310 may also provide a graphical representation of matches for non-centroided data sets, as illustrated in FIG. 7B. For example, referring to FIG. 7B, graph 710 may display matches between samples of input X and input Y in a similar manner as that shown in FIG. 7A. In FIG. 7B, however, graph 710 illustrates a non-centroided or raw data set in which not only peaks are displayed.

In either case, a user may view graphs 700 or 710 to get a visual representation of the matching performed by the CDTW algorithm executed by data processing logic 320. This graphical visualization may allow the user to fine tune various scoring performed by the CDTW algorithm.

As described above, data analysis program 310 may provide graphical information to a user, such as the information illustrated in FIGS. 6, 7A and 7B, to allow the user to better visualize and fine tune the processing performed by the CDTW algorithm. In some instances the information or signals may contain a very large number of points and graphical information provided via graphs 600, 700 and 710 in FIGS. 6, 7A and 7B, respectively, may not allow the user to easily focus on one particular region of interest when the entire range is provided. Therefore, graphic representation logic 340 may allow the user to zoom into a specific region of interest, such as a particular region of interest in any of graphs 600, 700 and 710, to obtain more detailed information.

For example, assume that the user zooms into a particular region of graph 700 of FIG. 7A. The user may perform such zooming using, for example, input device 260 in FIG. 2 (e.g., a mouse). Graphic representation logic 340 may then automatically adjust the limits of graph 700 to provide an expanded or larger view of the specific region of interest. Graphic representation logic 340 may also automatically adjust the limits of graph 600 to correspond to the area selected via graph 700 such that the shortest path alignment provided via graph 600 will zoom into the area of interest that the user has selected. Having the ability to zoom into specific regions of interest may allow the user may to more easily evaluate in detail the scores used while aligning such regions of interest. That is, the user may more easily assess the dynamics of the programmable scoring functions for both scoring of matches and penalties associated with gaps. In this manner, the user can pan or zoom in FIGS. 7A and 7B into regions of interest and graphic representation logic 340 may automatically provide adjusted displays, such as adjust graph 600 in accordance with the selected region of interest.

In some implementations, data analysis program 310 may be used to align or calibrate data using information stored in buffer 350 (FIG. 3). Buffer 350, as described briefly above, may store data associated with previously processed spectra. This information may be used to further enhance the alignment process, as described in detail below.

FIG. 8 is a flow chart of exemplary processing associated with buffering data and using the buffered data to process data sets. The processing described with respect to FIG. 8 may be applied to, for example, hyphenated mass spectrometry data sets that include centroided data, raw data (i.e., non-centroided data) and/or data representing peak lists (i.e., the highest X peaks in a sample). The datasets may include hundreds or even thousands of samples of data to be compared. Processing may begin by aligning or comparing two samples, also referred to herein as rows (act 810).

For example, processing similar to that described above with respect to FIGS. 7A and 7B may be used to align the first two rows of data in a data set that includes a large number of rows (e.g., 1000 or more) to identify matches in the two rows. Data processing logic 320 may store the alignment information representing the matches in buffer 350 (act 820). The alignment information may represent the best alignment determined up to this point for the data in the input data sets.

Data processing logic 320 may then begin processing the third row of data. According to an exemplary implementation, data processing logic 320 may compare the third row of data to the data in buffer 350, as opposed to comparing the data in the third row to data in each of the first and second rows (act 830). Data processing logic 320 may store the result of the alignment of the third row with the alignment information in buffer 350 into buffer 350 (act 830). That is, the result of the comparison of the third row with the information in buffer 350 may replace the previously stored information in buffer 350. In other words, buffer 350 may store the best alignment information for the most recent X rows processed by data processing logic 320.

Processing may continue in this manner for subsequent rows. That is, data in a row currently being processed may be aligned to the data in buffer 350, as opposed to attempting to align the data in each row to the data in each previous row. This may significantly reduce the processing burden on data processing logic 320.

In this manner, data processing logic 320 may align spectra that do not have common peaks along the whole chromatographic dimension. That is, a large peak (or compound) appearing at one region of the chromatographic separation can bias the alignment of the spectra of small peaks (or compounds) in other regions of the chromatographic separation, but with similar mass-charge values as the large peak. Using buffer 350 may minimize problems associated with such regions.

In addition, in some implementations, a user may not wish to align each new row of data to the information stored in buffer 350. In such cases, after a predetermined number of rows have been processed, data processing logic 320 may re-start the alignment buffering (act 840). For example, after row 10, data processing logic 320 may compare rows 11 and 12 and store the corresponding alignment information in buffer 350. Data processing logic 320 may then compare row 13 to the alignment information stored in buffer 350 and processing may continue in this manner through row 20, when the process starts over again. In this manner, buffer 350 may act as a sliding window to store alignment information for each group of, for example, 10 samples.

As described above, buffer 350 may be used in a recursive manner to align data with previously stored alignment information to obtain better alignment of subsequent signals. In some implementations, buffer 350 may be used recursively in a forward direction or a combination of forward and reverse directions. For example, data processing logic 320 may attempt to identify a better alignment for a particular signal by using alignment data associated with a number of subsequently processed rows of data (as opposed to using previously processed rows of data in the manner described above). This essentially amounts to a recursive approach in the forward direction. In other instances, data processing logic 320 may attempt to identify a better alignment for a particular signal using the previous X rows of data and the subsequent Y rows of data, where X and Y are any particular values. In this manner, data processing logic 320 may use a recursive approach to the alignment of data using both a forward and reverse directions with respect to various rows of data. In each case, data processing logic 320 may attempt to identify improved alignments using previously and/or subsequently processed data in a recursive manner.

In addition, in some implementations, data processing logic 320 may weight the information stored in buffer 350. For example, data processing logic 320 may use a Gaussian kernel centered at the chromatographic location of the spectrum being calibrated to weight the spectra utilized to create a list of local peak mass-charge values (CMZ). That is, various ones of the previous alignments may be weighted less heavily than the current row to minimize the effects of further alignments in the chromatographic dimension. In some implementations, an exponential curve may be may used as the weighting function, where a current row is weighted more heavily than a previous row. In each case, previous alignments or calibrations may be used to create, for example, a CMZ list for the next alignment.

The implementations described above focused on analyzing data generated and/or processed by mass spectrometry and/or chromatography equipment. It should be understood, however, that in other implementations, other types of input data sets may be analyzed by data analysis program 310.

In general, data analysis program 310 may be used to perform multiple alignments of sequences of data in which the information content is changing over a reference dimension (e.g., time). In MS, the information content may be measured as peaks in the signal. However, the user may define other ways to measure the information content (or extract features) in any given signal/data set. For example, in economics, as described in more detail below, information content may be measured by abrupt changes of market indicators. Therefore, high order derivatives may be applied to measure the information content. In each case, user defined indicators and constraints associated with the input data sets may be used to determine the alignment of the samples.

As one example, signals captured by radar arrays may be analyzed using data analysis program 310. In this case, due to the high dimensional structure of these signals, data analysis program 310 may be used to compare and/or analyze incoming signals to detect information of interest and/or spot trends in the radar data. In general, data analysis program 310 may be used in analyzing any data where an array of sensors may be used to take measurements. For example, the signals from an array of sensors may be used to measure the acceleration of a particular spacecraft. Such information may be aligned to the signals captured by the sensors arranged in a similar configuration in another spacecraft or in the same spacecraft, but during a different test flight. Voice signals may be also be processed by data analysis program Data analysis program 310, as described briefly above, may also be used to analyze economic related data sets. For example, CDTW may be used to analyze the flow of asymmetric information across markets. Since much interest is given to determining leading and lagging indicators in economics, CDTW may be used to dynamically identify the existence of such indicative relationships. The lags between these types of time-series may depend on different factors, such as liquidity and volatility, which vary over the market cycle and leverage, which also varies across option related issues. Conventional techniques use correlation methods or windowed correlation approaches to estimate the misalignment between two or more economic indicators. Using data analysis program 310 may allow economic related time-series data to be treated as multidimensional signals (measuring and characterizing different aspects of an indicator) and align these signals even when the lag is dependent on other time varying parameters and without the need to analyze it over different time windows.

In other instances in economics, it may be well understood that the signals generated by tracking different currencies are correlated. However, the lag between events can depend on other factors and it may be difficult to find common features to align "economical" events between the different signals. One common technique known as derivative dynamic time warping (DDTW) consists of using the estimated derivatives of the signals to find the nonlinear warping and/or using the derivative to unveil a hidden event useful for the alignment. Using data analysis program 310 may allow a user to extend this concept by introducing more powerful distance metrics between points in the time series, instead of using a Euclidean distance between the derivatives of the signal, such as in DDTW. That is, any distance function which takes into consideration the information content of the signal and maps it to a high-dimensional signal may be used. For example, a user may create 1) a wavelet decomposition, 2) an array of different order derivatives, 3) or any other feature extraction algorithm, which generates a multidimensional signal which can be aligned to others similar signals using data analysis program 310.

Still further, in chromatography alone (i.e., not in combination with MS), several separation processes involve capturing an image even though the separation is performed along a single dimension. For example, in gel electrophoresis, conventional approaches to processing these types of signals average the data over the rows of the image to reduce it to a one dimensional signal (before alignment) or use an algorithm to detect the most likely curve along the images which contain the most representative intensities. In an exemplary implementation, data analysis program 310 may bypass these steps since alignment over high dimensional points may be performed. In this case, each row of the image may be considered a sample in the alignment process.

Aspects described herein have also been described with respect to user device 110 executing data analysis program 310 to process various data sets. In other instances, data analysis program 310 may be accessible to various users/devices, such as user device 110, remotely. For example, FIG. 9 illustrates an exemplary network 900 in which devices, systems, methods and computer-readable mediums described herein may be implemented.

Figure 9:
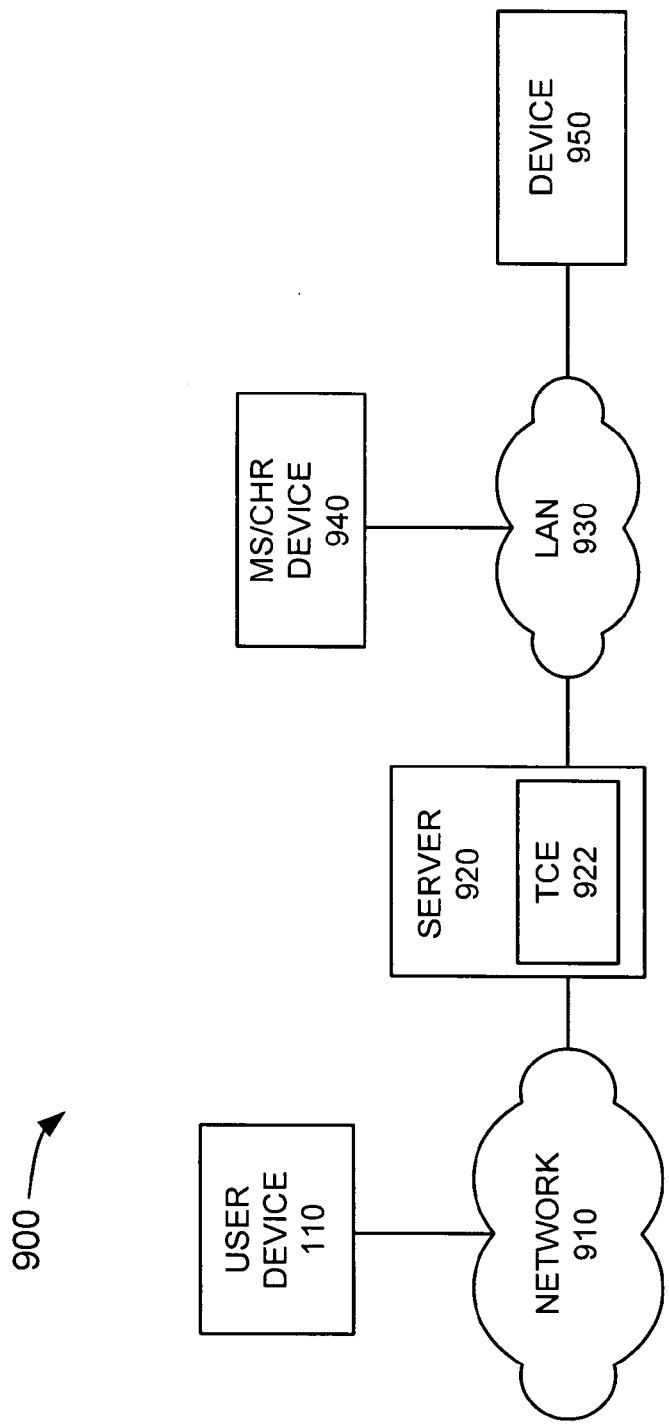
FIG. 9 is a diagram of an exemplary network in which systems and methods described herein may be implemented.

Referring to FIG. 9, network 900 may include user device 110, network 910, server 920, LAN 930, mass spectrometry (MS)/chromatography (CHR) device 940 and device 950. Server 920 may include one or more server devices that provides or supports technical computing environment (TCE) 922. TCE 922 may include hardware and/or software based logic that provides a computing environment or platform that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 922, which is illustrated as a single device, may include a number of distributed processing devices that each perform a portion of the processing for TCE 922.

In an exemplary implementation, TCE 922 may execute data analysis program 310 described above and users, such as a user at user device 110, may access server 920 and TCE 922 via network 910. Network 910 may include, for example, a LAN, a WAN, the public switched telephone network (PSTN), an intranet, the Internet, a wireless network, an optical network, a combination of networks, etc.

MS/CHR device 940 may include any type of mass spectrometry and/or chromatography device described above that may provide data sets that are to be analyzed by data analysis program 310. In some implementations, MS/CHR device 940 may provide the input data sets to server 920 and/or TCE 922 via LAN 930. LAN 930 may be a conventional local area network that is provided, for example, within a company. In other implementations, MS/CHR device 940 may be coupled to user device 110 and may provide input data sets to user device 110. In this case, user device 110 may then provide the input data sets to server 920 and/or TCE 922 via network 910.

Device 950 may include other types of devices and/or systems that may provide data for analysis by data analysis program 310. For example, device 950 may provide data sets for analysis by data analysis program 310 executed by TCE 922. These data sets may include data/signals captured by radar arrays, economic information, medical imaging information, voice/speech signals, etc., as described above.

In one implementation, TCE 922 may include a dynamically typed language that can be used to express problems and/or solutions in mathematical notations familiar to those of skill in the relevant arts. For example, TCE 922 may use an array as a basic element, where the array may not require dimensioning. In addition, TCE 922 may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 922 may further provide mathematical functions and/or graphical tools (e.g., for creating plots, surfaces, images, volumetric representations, etc.). In one implementation, TCE 922 may provide these functions and/or tools using toolboxes (e.g., toolboxes for signal processing, image processing, data plotting, parallel processing, etc.). In another implementation, TCE 922 may provide these functions as block sets. In still another implementation, TCE 922 may provide these functions in another way, such as via a library, etc. TCE 922 may be implemented as a text based environment, a graphically based environment, or another type of environment, such as a hybrid environment that is both text and graphically based.

In other embodiments, TCE 922 may be implemented using one or more text-based products. For example, a text-based TCE 922 may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. The text-based TCE may support one or more commands that support parallel processing.

In still other embodiments, TCE 922 may be implemented using a graphically-based products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment. The graphically-based TCE may support parallel processing using one or more distributed processing devices.

In still further embodiments, methods and systems described herein may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the product may use the MATLAB commands to perform parallel processing.

Still further embodiments may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data).

Figure 10:
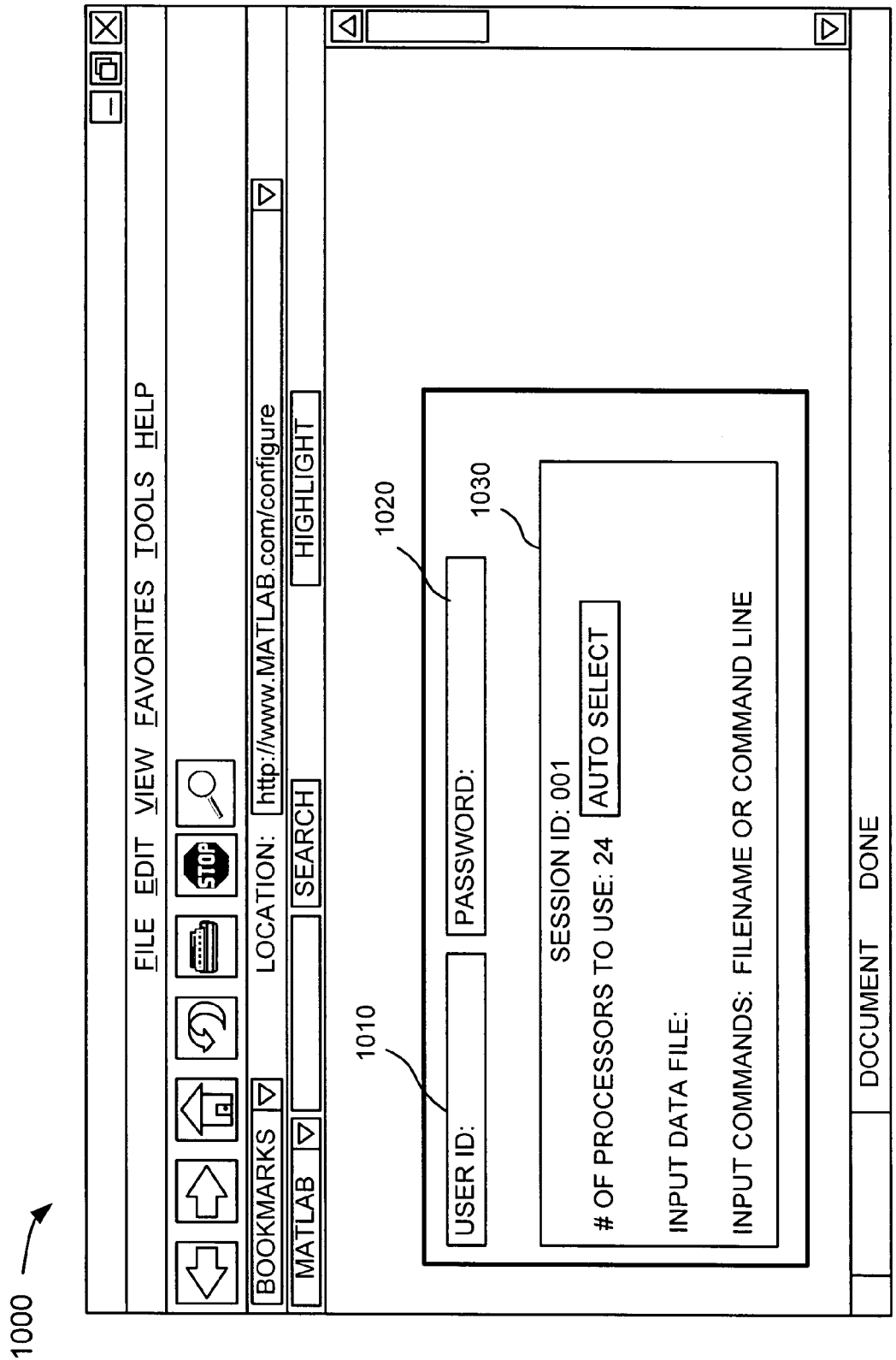
FIG. 10 is a diagram of an exemplary graphical user interface provided by the technical computing environment/platform of FIG. 9.

FIG. 10 illustrates an exemplary graphical user interface (GUI) 1000 associated with performing data analysis via user device 110 and/or TCE 922. Referring to FIG. 10, assume that a user at user device 110 wishes to input data for execution by data analysis program 310 executed by TCE 922. TCE 922 may provide GUI 1000, which includes a user identification (ID) area 1010 and a password area 1020 for allowing the user to enter an ID and/or password. In some implementations GUI 1000 may also include an input area 1030 that allows a user to specify a number of processors to use when executing data analysis program 310. For example, exemplary implementations may use a number of distributed processing devices (e.g., a grid of parallel processors) to perform CDTW processing. Input area 1030 may also allow the user to specify an input data file for execution by data analysis program 310. The input data file may identify a location of a number of data sets that the user wishes to align or compare. User input area 1030 may also include an area for allowing the user to specify which particular program (e.g., data analysis program 310) that the user wishes to run. A number of drop down menus may facilitate entry of the particular information via GUI 1000.

Figure 11:
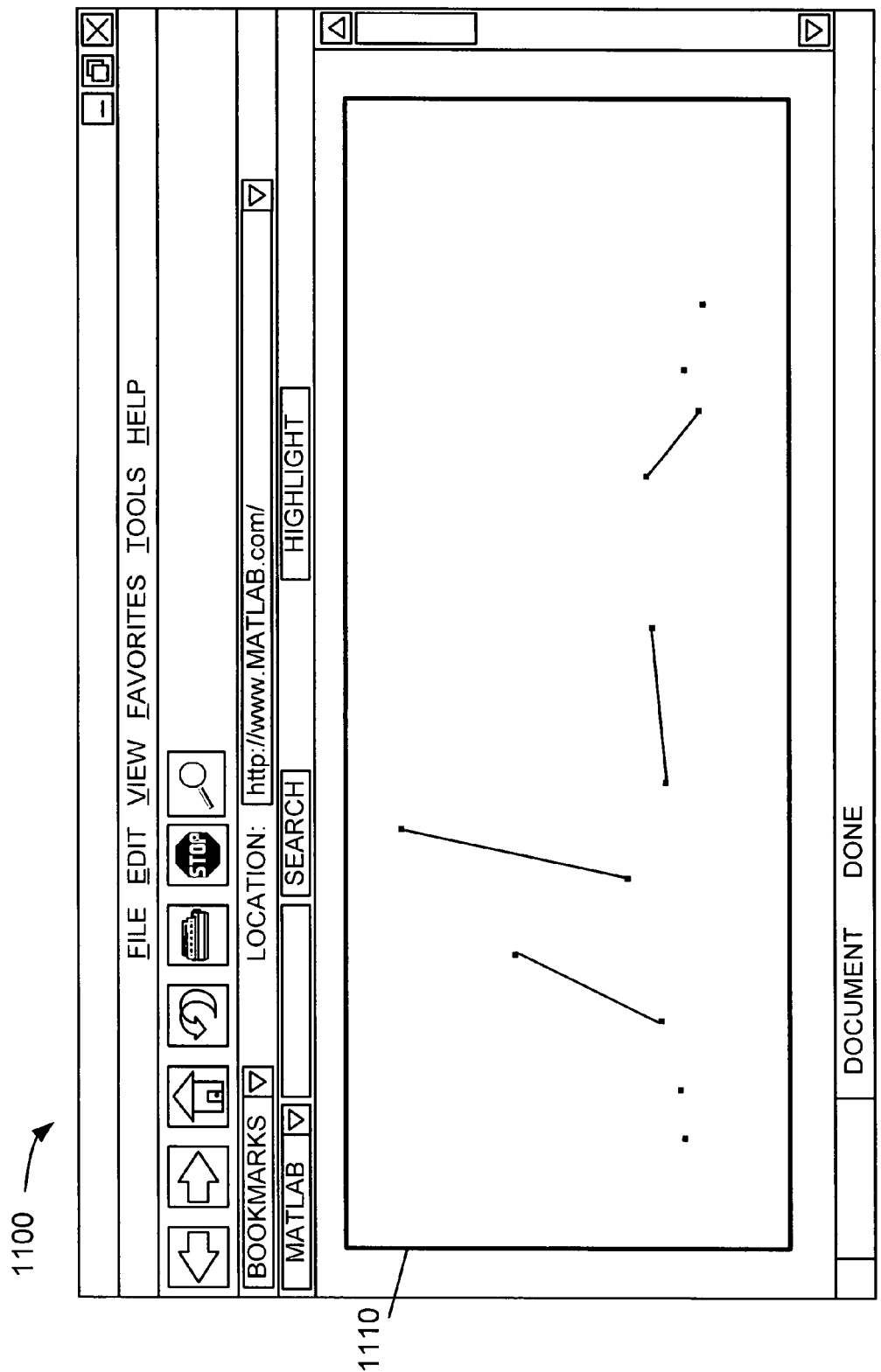
FIG. 11 is a diagram of an exemplary graph provided by the graphical user interface of FIG. 10.

Assume that the user provides the input data file and specifies that he/she would like to run data analysis program 310. In this case, TCE 922 may execute the desired program. TCE 922 may then output the desired information to the user. For example, TCE 922 may provide an output, such as GUI 1100 illustrated in FIG. 11. Referring to FIG. 11, GUI 1100 may include a display window 1110 that provides the output of data analysis program 310. Referring to FIG. 11, window 1110 may provide, for example, sample matching similar to that described above with respect to FIG. 7A. The user may then input particular commands, such as zoom in/out on an area of interest, etc. (as described above), to obtain additional information and to also run the CDTW algorithm to align the data sets.

As described above, systems and methods described herein may process and compare input data sets and output information of interest to a user. In some implementations, aspects described herein may be performed via, for example, a web service. For example, processing described above with respect to data analysis program 310 may be provided to a client device, such as user device 110, using a web service. The term "web service," as used herein, may be a software application that allows machine to machine communication over a network. For example, a server may communicate with a client using an application programming interface (API) that the client accesses over the network. In one embodiment, the server may exchange hypertext markup language (HTML), extensible markup language (XML) or other types of messages with the client using industry compatible standards, such as simple object access protocol (SOAP) and/or proprietary standards. Web services may further be network services that can be described using industry standard specifications, such as web service definition language (WSDL) and/or proprietary specifications. In each case, the server may provide processing associated with the user's data and output graphical and/or text based results to the user via the web service.

CONCLUSION

Systems and methods described herein provide for processing data sets to obtain information of interest. In addition, various graphical representations may allow the user to visually identify trends and/or make changes to various parameters.

The foregoing description of exemplary embodiments provides illustration and description, but is not intended to be exhaustive or to limit the invention to the precise form disclosed. Modifications and variations are possible in light of the above teachings or may be acquired from practice of the invention. For example, while particular types of input data sets have been described above, in other embodiments, other types of data sets may be analyzed via data analysis program 310.

In addition, in some implementations, data analysis program 310 may implement the processing described above, including the CDTW algorithm, in a recursive manner. For example, the obtained warping relationship between two sequences of observations may be smoothed or regressed by a slow, varying function. This smoothing may correct the signals on a rough scale. The CDTW algorithm executed by data processing logic 320 may then be recursively repeated to refine the correction. In this manner, data analysis program 310 may improve the robustness of the alignment. This may be particularly advantageous in situations when it is known that the warping function between the reference dimension associated with both sequences of data should not have abrupt changes. In addition, it should be noted that the CDWT algorithm may be implemented recursively in a forward direction, reverse direction or combination of forward and reverse directions to attempt to improve the alignment.

Still further, implementing the CDWT algorithm recursively for multiple alignments between pair-wise alignments may be used to reveal trends in the warping function of these datasets. For example, data analysis program 310 may perform pair wise alignments in an LC-MS dataset and analyze the resulting warping functions. In such cases, a user may observe that misalignments may occur more frequently when separating the large molecules in a mixture than the smaller molecules. Such information may be helpful in analyzing the alignment information.

It should also be understood that implementations described herein may be used to perform multiple alignments in a multi-core/multi-platform environment. In such cases, data analysis program 310 may rely upon a graph theory based, shortest path algorithm to efficiently process the data sets. In addition, use of data analysis program 310 in a multi-core/multi-platform environment may be used to enhance the computational performance of methods described herein.

While series of acts have been described with regard to FIGS. 4A, 4B and 8, the order of the acts may be modified in other embodiments. Further, non-dependent acts may be performed in parallel.

It will be apparent that aspects, as described above, may be implemented in many different forms of software, firmware, and hardware in the embodiments illustrated in the figures. The actual software code or specialized control hardware used to implement aspects described herein is not limiting of the invention. Thus, the operation and behavior of the aspects were described without reference to the specific software code—it being understood that one would be able to design software and control hardware to implement the aspects based on the description herein.

Further, certain portions of the invention may be implemented as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium to store instructions executable by at least one processor to cause the at least one processor to:

receive at least two data sets; and execute a constrained time domain warping (CDTW) algorithm to compare the at least two data sets, the executing the CDTW algorithm causing the at least one processor to:

use a band constraint to identify potential matches between observations in the at least two data sets, the band constraint comprising a function that defines a non-constant band constraint, the band constraint reducing a complexity of the CDTW algorithm from O(MN) to O(sqrt(MN)*K), M and N corresponding to a quantity of observations, and K corresponding to a constant that is less than M and N, and use a width constraint that defines a number of matched observations that are to be scored.

2. The non-transitory computer-readable medium of claim 1, where the instructions further cause the at least one processor to:

receive the function defining the non-constant band constraint from a user.

3. The non-transitory computer-readable medium of claim 1, where the instructions further cause the at least one processor to:

generate a graphical representation of a search space associated with the at least two data sets, the graphical representation displaying a search space associated with the band constraint, a search space associated with the width constraint, and a search space associated with a combination of the band and width constraints.

4. The non-transitory computer-readable medium of claim 3, where the instructions further cause the at least one processor to:
output the graphical representation to a display, the graphical representation including a number corresponding to the search space associated with the combination of the band and width constraints.

5. The non-transitory computer-readable medium of claim 1, where the instructions further cause the at least one processor to:
receive input from a user to modify at least one of the band constraint or the width constraint.

6. The non-transitory computer-readable medium of claim 5, where the instructions further cause the at least one processor to:
generate a second graphical representation of the search space associated with the at least two data sets based on the received input from the user; and
output the second graphical representation to a display.

7. The non-transitory computer-readable medium of claim 1, where the instructions further cause the processor to:
generate a graphical representation of a shortest path alignment between the at least two data sets; and
output the graphical representation to a display.

8. The non-transitory computer-readable medium of claim 7, where the graphical representation identifies matches and non-matches between observations in the at least two data sets.

9. The non-transitory computer-readable medium of claim 8, where the graphical representation displays scoring information associated with non-matches included in the shortest path alignment.

10. The non-transitory computer-readable medium of claim 9, where the graphical representation displays the scoring information using different colors to represent different scores associated with matches and non-matches in the shortest path alignment.

11. The non-transitory computer-readable medium of claim 8, where the graphical representation of the shortest path alignment displays other possible path alignments.

12. The non-transitory computer-readable medium of claim 1, where the instructions executed by the at least one processor are executed on behalf of a technical computing environment or platform.

13. The non-transitory computer-readable medium of claim 12, where the technical computing environment or platform executes MATLAB code, Simulink software, MATLAB-compatible software, or Simulink compatible software.

14. The non-transitory computer-readable medium of claim 1, where the at least one processor is to receive the at least two data sets via a command or instruction that is compatible with a MATLAB, or a Simulink compatible command or instruction.

15. The non-transitory computer-readable medium of claim 1, where the at least one processor comprises a plurality of distributed processing devices.

16. The non-transitory computer-readable medium of claim 1, where the instructions cause the at least one processor to provide a graphical user interface (GUI) to a user, the GUI being to receive commands associated with processing the at least two data sets.

17. The non-transitory computer-readable medium of claim 16, where the GUI is provided to the user via a web service.

18. The non-transitory computer-readable medium of claim 16, where the GUI is further to:
display a graphical representation of matches between the at least two data sets.

19. The non-transitory computer-readable medium of claim 18, where the GUI is further to:
receive a command from a user to zoom in on a portion of the graphical representation of the matches, and
display a portion of a shortest path alignment between the at least two data sets in response to the command, the portion of the shortest path alignment corresponding to the portion of the graphical representation of the matches.

20. The non-transitory computer-readable medium of claim 1, where the at least two data sets comprise data processed by mass spectrometry equipment or chromatography equipment.

21. The non-transitory computer-readable medium of claim 1, where the at least two data sets comprise radar related data, economic data, voice data or image data.

22. A system, comprising:
an input device to receive two data sets; and
logic to:
execute a constrained time domain warping (CDTW) algorithm to compare information in the two data sets using a first constraint and a second constraint, the first constraint comprising a function that defines a non-constant constraint, and the second constraint defining a number of matched observations in the two data sets that are to be scored,
when executing the CDTW algorithm, the logic is to:
use the first constraint to identify potential matches between observations in the two data sets, the first constraint reducing a complexity of the CDTW algorithm from a first complexity, corresponding to a first function that is based on M and N, to a second complexity, corresponding to a second function that is based on M, N, and K, M and N corresponding to a quantity of observations associated with the two data sets, and K corresponding to a constant that is less than M and N.

23. The system of claim 22, where the logic is further to:
generate a graphical representation of a search space associated with the two data sets, the graphical representation displaying a search space associated with the first constraint, a search space associated with the second constraint, and a search space associated with a combination of the first and second constraints.

24. The system of claim 22, where the logic comprises MATLAB code, Simulink software, MATLAB-compatible software, or Simulink compatible software.

25. The system of claim 22, where the two data sets comprise data associated with at least one of mass spectrometry or chromatography.

26. A non-transitory computer-readable medium to store instructions executable by at least one processor, the computer-readable medium comprising:
instructions to execute a constrained time domain warping (CDTW) algorithm to compare two data sets, the CDTW algorithm using a first constraint to define a metric associated with potential matches in the two data sets and a second constraint to define a number of matches that are to be scored,
the instructions to execute the CDTW algorithm comprising:
instructions to use the first constraint to identify potential matches between observations in the two data sets, the first constraint comprising a function that defines a non-constant constraint, the first constraint reducing a complexity of the CDTW algorithm from a first complexity, corresponding to a first function that is based on M and N, to a second complexity, corresponding to a second function that is based M, N, and K, M and N corresponding to a quantity of observations associated with the two data sets, and K corresponding to a constant that is less than M and N;

instructions to generate, based on the executed CDTW algorithm, a graphical representation of a shortest path alignment between the two data sets; and instructions to output the generated graphical representation for display.

27. The non-transitory computer-readable medium of claim 26, where the graphical representation includes matches and non-matches between observations in the two data sets.

28. The non-transitory computer-readable medium of claim 26, where the graphical representation displays scoring information associated with non-matches included in the shortest path alignment.

29. The non-transitory computer-readable medium of claim 28, where the graphical representation displays the scoring information using different colors to represent different scores associated with matches and non-matches in the shortest path alignment.

30. The non-transitory computer-readable medium of claim 26, where the graphical representation of the shortest path alignment displays other possible path alignments.

31. The non-transitory computer-readable medium of claim 26, where observations included in the first and second data sets represent multi-dimensional observations.

32. The non-transitory computer-readable medium of claim 26, further comprising:

instructions to repeat the execution of the CDTW algorithm in a recursive manner.

33. The non-transitory computer-readable medium of claim 26, where the instructions are executed by a plurality of distributed processing devices.

34. The non-transitory computer-readable medium of claim 26, where the two data sets comprise data associated with at least one of mass spectrometry or chromatography.

35. A non-transitory computer-readable medium to store instructions, executable by at least one processor, to cause the at least one processor to perform a method comprising:

receiving a plurality of signals;

performing a first alignment, associated with a first two of the plurality of signals, based on executing a constrained time domain warping (CDTW) algorithm to compare the first two of the plurality of signals, executing the CDTW algorithm comprising:

using a first constraint to identify potential matches between observations in the first two of the plurality of signals, the first constraint comprising a function that defines a non-constant constraint, the first constraint reducing a complexity of the CDTW algorithm from a first complexity, corresponding to a first function that is based on M and N, to a second complexity, corresponding to a second function that is based on M, N, and K, M and N corresponding to a quantity of observations associated with the two data sets, and K corresponding to a constant that is less than M and N;

storing first alignment information in a buffer based on the performed first alignment;

performing a second alignment associated with a third one of the plurality of signals, using the first alignment information stored in the buffer, based on executing the CDTW algorithm to compare the third one of the plurality of signals to the stored first alignment information, the executing the CDTW algorithm comprising:

using the first constraint to identify potential matches between observations in the third one of the plurality of signals and the stored first alignment information; and storing second alignment information in the buffer based on the second alignment.

36. The non-transitory computer-readable medium of claim 35, where the storing second alignment information comprises:

replacing the first alignment information with the second alignment information.

37. The non-transitory computer-readable medium of claim 35, where the method further comprises:

repeating the alignment associated with a predetermined number of the plurality of signals using information stored in the buffer.

38. The non-transitory computer-readable medium of claim 35, where the buffer is to store alignment information to be used for aligning a predetermined number of the plurality of signals.

39. The non-transitory computer-readable medium of claim 35, where the method further comprises:

recursively performing alignment for the plurality of signals using at least one of previously stored alignment information or subsequently stored alignment information.

40. The non-transitory computer-readable medium of claim 35, where the plurality of signals comprises at least one of signals processed by mass spectrometry equipment or signals process by chromatography equipment.

41. The non-transitory computer-readable medium of claim 35, where the plurality of signals comprises signals associated with at least one of radar signals, voice signals, or economic related information.

* * * * *